United States Patent
Chan et al.

(10) Patent No.: US 6,202,128 B1
(45) Date of Patent: *Mar. 13, 2001

(54) METHOD AND SYSTEM FOR PRE-FETCH CACHE INTERROGATION USING SNOOP PORT

(75) Inventors: Kin Shing Chan, Austin; Dwain Alan Hicks, Pflugerville; Peichun Peter Liu, Austin; Michael John Mayfield, Austin; Shih-Hsiung Stephen Tung, Austin, all of TX (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/038,422

(22) Filed: Mar. 11, 1998

(51) Int. Cl.⁷ .................................................. G06F 12/08
(52) U.S. Cl. ......................... 711/131; 711/137; 711/146; 711/168
(58) Field of Search ................................... 711/131, 137, 711/146, 168

(56) References Cited

U.S. PATENT DOCUMENTS

| | | | |
|---|---|---|---|
| 5,228,135 | * 7/1993 | Ikumi | 711/131 |
| 5,353,424 | 10/1994 | Partovi et al. | 711/128 |
| 5,426,765 | 6/1995 | Stevens et al. | 711/131 |
| 5,446,863 | 8/1995 | Stevens et al. | 711/100 |
| 5,537,640 | 7/1996 | Pawlowski et al. | 711/146 |
| 5,557,769 | 9/1996 | Bailey et al. | 711/146 |
| 5,619,674 | * 4/1997 | Ikumi | 711/131 |
| 5,640,534 | 6/1997 | Liu et al. | 711/146 |
| 5,696,935 | 12/1997 | Grochowski et al. | 711/125 |
| 5,752,260 | * 5/1998 | Liu | 711/131 |
| 5,761,714 | * 6/1998 | Liu et al. | 711/131 |
| 5,802,567 | * 9/1998 | Liu et al. | 711/131 |
| 5,996,061 | * 11/1999 | Lopez-Aguado et al. | 712/207 |

FOREIGN PATENT DOCUMENTS

| | | |
|---|---|---|
| 0 708 404 A2 | 4/1996 | (EP) . |
| 0 741 356 A1 | 11/1996 | (EP) . |
| 1-288940 | 5/1988 | (JP) . |
| 3-282948 | 3/1990 | (JP) . |

OTHER PUBLICATIONS

European Search Report; EP 99 30 1537; Jul. 1, 1999.

* cited by examiner

Primary Examiner—Reginald G. Bragdon
(74) Attorney, Agent, or Firm—Robert M. Carwell; Felsman, Bradley, Vaden. Gunter & Dillon, LLP

(57) ABSTRACT

An interleaved data cache array which is divided into two subarrays is provided for utilization within a data processing system. Each subarray includes a plurality of cache lines wherein each cache line includes a selected block of data, a parity field, a content addressable field containing a portion of an effective address (ECAM) for the selected block of data, a second content addressable field contains a real address (RCAM) for the selected block of data and a data status field. Separate effective address ports (EA) and a real address port (RA) permit parallel access to the cache without conflict in separate subarrays and a subarray arbitration logic circuit is provided for attempted simultaneous access of a single subarray by both the effective address port (EA) and the real address port (RA). A normal word line is provided and activated by either the effective address port or the real address port through the subarray arbitration. An existing Real Address (RA) cache snoop port is used to check whether a pre-fetching stream's line access is a true cache hit or not. The snoop read access uses a (33-bit) real address to access the data cache without occupying a data port during testing of the pre-fetching stream hits. Therefore, the two Effective Address (EA) accesses and a RCAM snoop access can access the data cache simultaneously thereby increasing pre-fetching performance.

10 Claims, 6 Drawing Sheets

METHOD AND SYSTEM FOR PRE-FETCH CACHE INTERROGATION USING SNOOP PORT

BACKGROUND OF THE INVENTION

1. Technical Field

The present invention is directed to an improved data processing system and in particular to an improved data cache array for utilization in a data processing system. Still more particularly the present invention relates to an improved method and system for efficient pre-fetch performance and normal load performance of a microprocessor memory system.

2. Description of the Related Art

Many systems for processing information include both a system memory and a cache memory. A cache memory is a relatively small, high-speed memory that stores a copy of information from one or more portions of the system memory. Frequently, the cache memory is physically distinct from the system memory. Such a cache memory can be integral with the processor device of the system (referred to as an L1 cache) or non-integral with the processor (referred to as an L2 cache).

Information may be copied from a portion of the system memory into the cache memory. The information in the cache memory may then be modified. Further, modified information from the cache memory can then be copied back to a portion of the system memory. Accordingly, it is important to map information in the cache memory relative to its location within system memory. Assuming selection of an appropriately sized cache memory and the efficient of data therein the limiting factor in cache performance is the speed of the cache memory and the ability of the system to rapidly write data into or read data from the cache memory.

A cache memory typically includes a plurality of memory sections, wherein each memory section stores a block or a "line" of two or more words of data wherein a line consists of eight "doublewords" (wherein each doubleword comprises eight 8-bit bytes). Each line has associated with it an address tag that uniquely identifies which line of system memory it is a copy of. When a read request originates in the processor for a new word (or a new doubleword or a new byte), whether it is data or instruction, an address tag comparison is made to determine whether a copy of the requested word resides in a line of the cache memory. If present, the data is used directly from the cache. This event is referred to as a cache read "hit". If not present, a line containing the requested word is retrieved from system memory and stored in the cache memory. The requested word is simultaneously supplied to the processor. This event is referred to as a cache read "miss".

In addition to using a cache memory to retrieve data, the processor may also write data directly to the cache memory instead of to the system memory. When the processor desires to write data to memory, an address tag comparison is made to determine whether the line into which data is to be written resides in the cache memory. If the line is present in the cache memory, the data is written directly into the line. This event is referred to as a cache write "hit". If the line into which data is to be written does not exist in the cache memory, the line is either fetched into the cache memory from system memory to allow the data to be written into the cache, or the data is written directly into the system memory. This event is referred to as a cache write, "miss."

In cache implementations of the present invention, it is useful to perform the address tag comparisons by access of directories having an effective address (EA) in parallel with getting a Real address (RA) to verify that there is a cache line "Hit". For example, the cache of the present invention may have 2 or more data ports, each with an EA content addressable memory (ECAM) directory containing partial EA addresses and a RA content addressable memory (RCAM) directory containing RA addresses. If the ECAM access results in a Hit, the RCAM confirms the hit is true by comparing the RCAM with the RA. When performing data prefetching for the cache, a data cache controller uses a real address (RCAM) lookup cycle to check whether the prefetching line is a true hit or not. If it is a RCAM hit, the cache controller "kills" the operation. If it is a RCAM miss, the cache controller continues prefetching a line of data into the cache memory from system memory.

However, by way of limitation, using the RCAM lookup cycle for the prefetch test will use the RCAM path of one of the two data ports. Therefore it is a subject of the present invention that the data port data is really not needed by the prefetching operation. Since the prefetch access uses one data port, the cache controller has to block one of the two aforementioned EA ports so that only one is available for the critical load accesses to the cache during prefetching. As a result of this type of prior art prefetching, cache performance is affected significantly. To suspend prefetching until an EA port is free, degrades the prefetch performance.

In view of the above, it should be apparent that a method and system for improving memory pre-fetch performance to a data cache would be highly desirable

SUMMARY OF THE INVENTION

It is therefore one object of the present invention to provide an improved data process system.

It is another object of the present invention to provide a method to improve the memory pre-fetch performance as well as normal load performance of a microprocessor memory system.

It is yet another object of the present invention to provide an improved method and system for testing pre-fetch line residency in the cache without interfering with the cache data port accesses.

The foregoing objects are achieved as is now described. An interleaved data cache array which is divided into two subarrays is provided for utilization within a data processing system. Each subarray includes a plurality of cache lines wherein each cache line includes a selected block of data, a parity field, a content addressable field containing a portion of an effective address (ECAM) for the selected block of data, a second content addressable field contains a real address (RCAM) for the selected block of data and a data status field. Separate effective address ports (EA) and a real address port (RA) permit parallel access to the cache without conflict in separate subarrays and a subarray arbitration logic circuit is provided for attempted simultaneous access of a single subarray by both the effective address port (EA) and the real address port (RA). A normal word line is provided and activated by either the effective address port or the real address port through the subarray arbitration. An existing Real Address (RA) cache snoop port is used to check whether a pre-fetching stream's line access is a true cache hit or not. The snoop read access uses a (33-bit) real address to access the data cache without occupying a data port during testing of the pre-fetching stream hits. Therefore, the two Effective Address (EA) accesses and a RCAM snoop access can access the data cache simultaneously thereby increasing pre-fetching performance as well as normal load performance.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
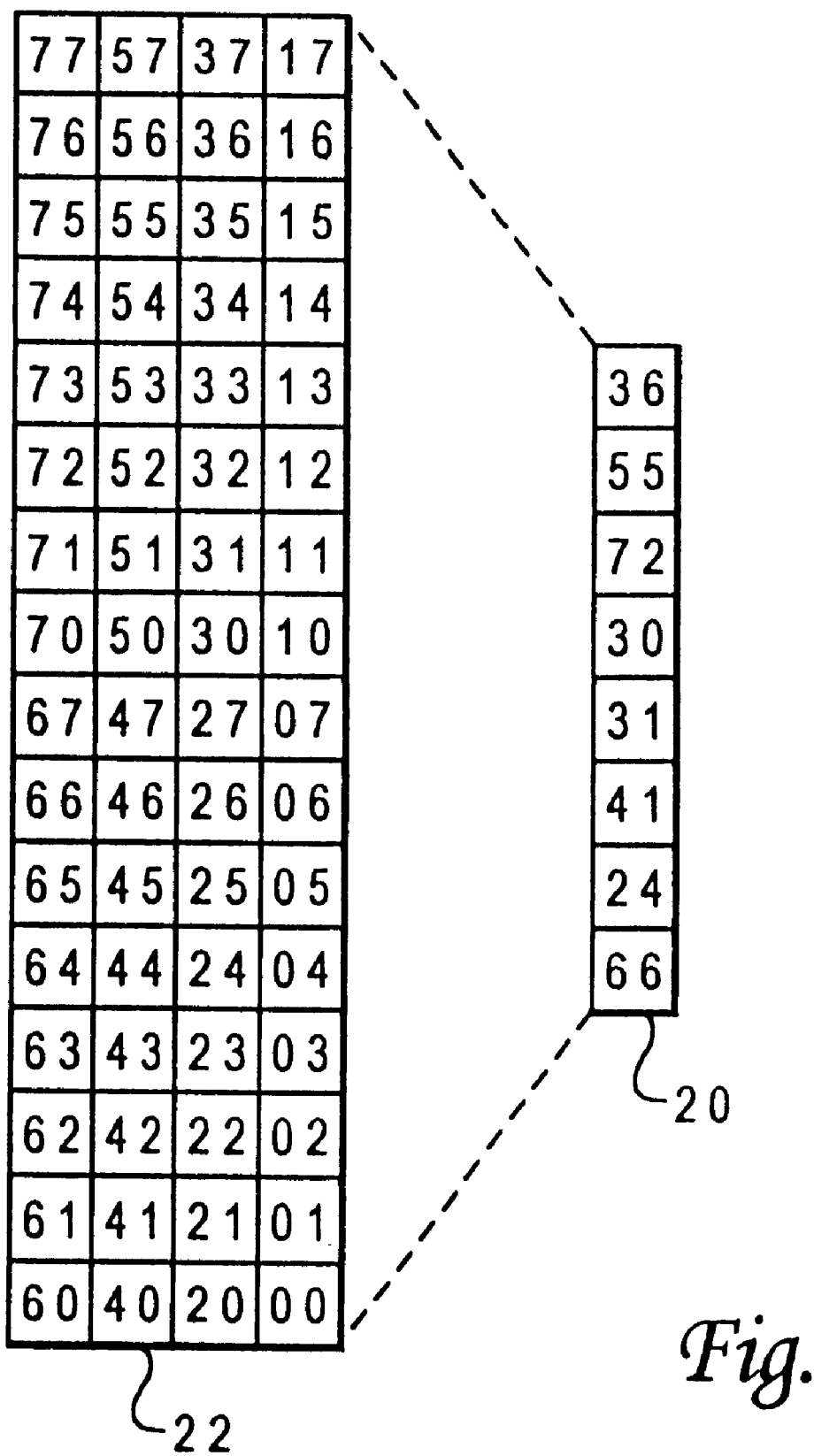
FIG. 1 is a conceptual illustration of a semi-associative mapping technique for caching information, in accordance with the present invention.

Referring now to the drawings wherein like reference numerals refer to like and corresponding parts throughout, FIG. 1 depicts a conceptual illustration of a semi-associative mapping technique for caching information in accordance with the present invention. As illustrated, a cache directory 20 has $p=2^k=8$ entries (or "locations"), each associated with a respective block (or location) of information within a cache memory provided in accordance with the present invention. Matrix 22 is depicted, which includes $q=2^{m+k}=64$ octal addresses, each representing a respective block (or "location") of information within a secondary memory, depicted within FIG. 3. Each of the q octal addresses of matrix 22 has $m+k=6$ address bits.

As illustrated in FIG. 1, matrix 22 and directory 20 are logically arranged into $2^{(k+j)}$ congruence classes, where $2^k$ is a number of primary congruence classes and $2^j$ is a number of secondary congruence classes ("congruence subclasses"). For FIG. 1, $p*2=2^{(k+j)}=16$, so that $k=3$ and $j=1$. A primary/secondary congruence class is specified by an addresses's index (k+j) address bits. Accordingly, each congruence class includes multiple addresses, all of which share the same index (k+j) address bits.

For example, in FIG. 1, one congruence class includes all addresses whose index (k+j) address bits are 0001. This congruence class includes the octal addresses 01, 21, 41 and 61. Likewise, another congruence class (whose index (k+j) address bits are 1001) includes the octal addresses 11, 31, 51 and 71.

In should be noted that congruence classes are not pre-assigned to entries within cache directory 20. Instead, congruence classes are dynamically associated with (or "allocated to") entries within cache directory 20. Accordingly, each cache directory 20 entry is able to relate a cache memory block to any of the multiple secondary memory blocks in more than one congruence class.

Thus, at any single moment, up to $2^k$ of the $2^{k+j}$ congruence classes have respective associated entries within cache directory 20 in any grouping and in any order. Accordingly, at any single moment, the cache memory stores information for up to $2^k$ of the $2^{(k+j)}$ congruence classes in any grouping and in any order. The value of a congruence class is stored in the k+j content addressable memory (CAM) cells of the congruence classes's dynamically associated entry within cache directory 20. In a congruence classes's associated entry within cache directory 20, one of multiple addresses of the congruence class is specified. For example, in the congruence classes's associated entry, cache directory 20 can store a tag including the addresses's high-order (m−j) address bits. For FIG. 1, m=3.

As an example, in FIG. 1, from among the four addresses whose index (k+j) address bits are 1101 (octal addresses 15, 35, 55 and 75), cache directory 20 indicates that the cache memory stores information for octal address 55. In such a situation, the k+j index bits 1101 are stored in the CAM bits portion of the congruence classes's cache directory 20 entry, and a m−j tag bits are stored in the tag portion of the congruence classes's cache directory 20 entry. By comparison, cache directory 20 indicates that the cache memory stores information for none of the four addresses (octal addresses 03, 23, 43 and 63) whose index (k+j) address bits are 0011.

In the prior art, a particular congruence class is allowed only one associated entry within cache directory 20, such that the cache directory is able to store information for only one address of the particular congruence class at a single moment. By comparison, in the preferred embodiment, a particular congruence class is allowed multiple associated entries within cache directory 20, in any grouping and in any order, such that the cache memory is able to store information for multiple addresses of the particular congruence class at any single moment in any grouping and in any order.

Figure 2:
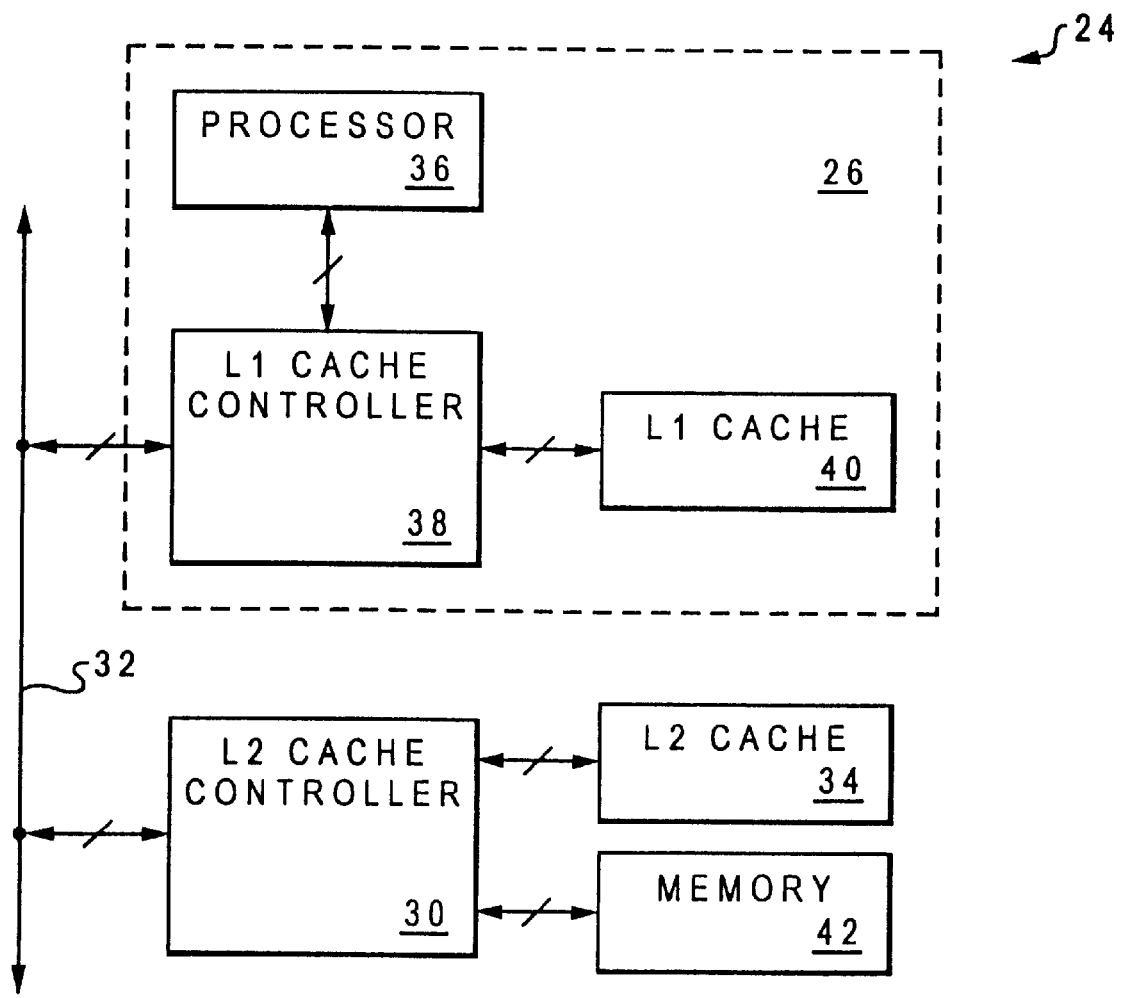
FIG. 2 is a block diagram of an exemplary system including first and second processing systems and a level 2 ("L2") cache memory.

With reference now to FIG. 2, there is depicted a block diagram of a data processing system in accordance with the present invention, indicated generally as 24 including a first processing system 26 and a level 2 ("L2") cache controller 30, connected to one another through a system bus 32. L2 cache controller 30 controls an L2 cache memory 34, according to a real 4-way set-associative mapping technique. L2 cache memory 34 is accessed in response to real addresses. Processing system 26 preferably includes a processor 36, an L1 cache controller 38, and an L1 cache memory 40. L1 cache controller 38 is connected to system bus 32, to processor 36 and to L1 cache memory 40. L1 cache controller 38 controls L1 cache memory 40 according to the semi-associative mapping technique disclosed herein.

Referring once again to FIG. 2, L2 cache memory 34 is preferably organized as a real-cache having a block size at least as large as the block size of L1 cache memory 40. Notably, the set of blocks in L1 cache memory 40 is a subset of the blocks in L2 cache memory 34. Any block of information stored in L2 cache memory 34 likewise can be stored in L1 cache memory 40. If the number of blocks in L1 cache memory 40 is p, then any p blocks (out of the total number of blocks stored in L2 cache memory 34) may be stored in L1 cache memory 40. For multiprocessor and I/O cache consistency, a directory of L2 cache memory 42 stores a real address for each block stored in L1 cache memory 40.

Aliasing in a system of the type set forth herein is supported on a page granularity, such that a real block of information may have different effective addresses. In an exemplary embodiment, the different effective addresses (corresponding to the same real block of information) may differ by an integral multiple of 4 kilobytes, which is the page size. As an example, if the size of L1 cache memory 40 is 32 kilobytes with a block size of 64 bytes, then L1 cache memory 40 has 512 blocks. In addition to the 64 bytes of information, each block has directory information including a real address and various status bits.

Thus, each of the 512 blocks of information in L1 cache memory 40 is associated with an effective address. A portion of the effective address is formed by bits $2^{12}$ through $2^c$ of each blocks' associated effective address. In the exemplary embodiment, c=19, and the effective address is either 32 bits or 64 bits in length. By searching L1 cache memory 40 in response to an effective address (EA) (see FIG. 3), one-cycle loads are achievable.

Figure 3:
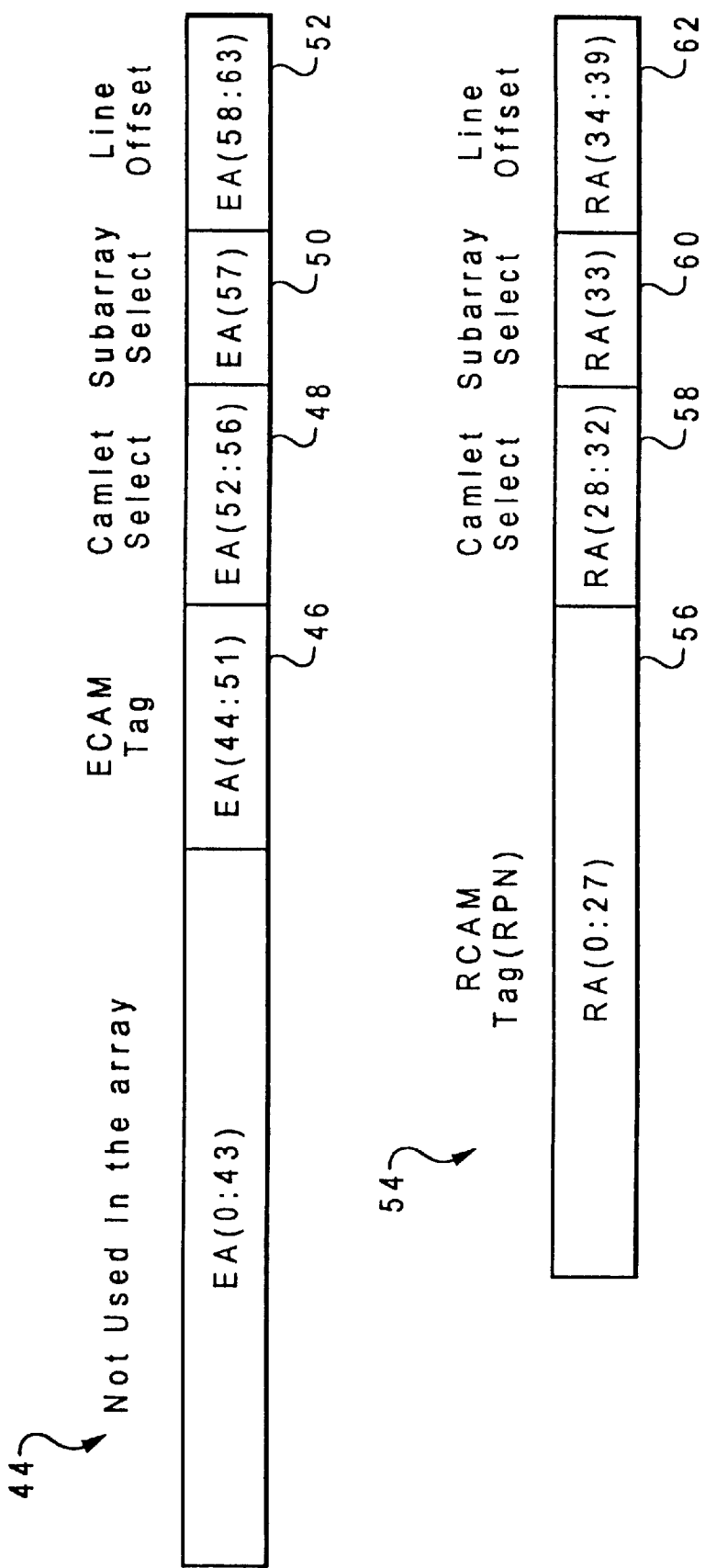
FIG. 3 is a graphic illustration of an addressing scheme utilized within the system of the present invention.

Referring now to FIG. 3, there is depicted a graphic illustration of an addressing system, which may be utilized within the system of the present invention. As illustrated, an effective or virtual address (EA) 44 is graphically depicted within FIG. 3. Effective address (EA) 44 preferably includes 64 bits; however, bits 0 through bit 43 are not utilized within the data cache array of the present invention. As depicted, bits 58 through 63, as illustrated at 52, represent the line offset of the effective address. Bit 57, as depicted at 50, is utilized to select one of two subarrays within the data cache array of the present invention. Next, bits 52 through 56, as depicted at 48, are utilized to select one of 32 camlets within each subarray of the data cache array of the present invention. In the depicted embodiment of the present invention each "camlet" comprises eight lines of the data cache array, which are laid out in a manner which will be explained in greater detail herein. Finally, eight bits of the effective address, bits 44 through 51, as depicted at 46, form a content addressable memory field referred to herein as the "ECAM" tag present within each line of the data cache array provided in accordance with the present invention.

Next, as depicted at block 54, an exemplary real address (RA), which may be utilized with the system of the present invention, is depicted. As above, six bits, bits 34–39, as illustrated at 62, are the line offset for the real address (RA). Bit 33, as depicted at block 60, is utilized to select one of the two subarrays within the data cache array of the present invention and, five bits, bits 28–32, as illustrated at 58, are utilized to select a particular one of the 32 camlets within each subarray. Finally, as depicted at 56, 28 bits of the real address for an associated block of information are stored within a second content addressable field, referred to herein as "RCAM". Although not described herein in detail, those skilled in the art will appreciate that during any comparison between a desired address and the potions of the address stored within the ECAM field and the RCAM field, the bits identifying the camlet must also be compared.

Thus, those skilled in the art will appreciate that in accordance with the addressing system depicted within FIG. 3, each block of information within a system which incorporates the data cache array of the present invention will include two separate and distinct content addressable fields which may be utilized in conjunction with either a portion of the effective address or the real address to select a block of information within the cache array.

Figure 4:
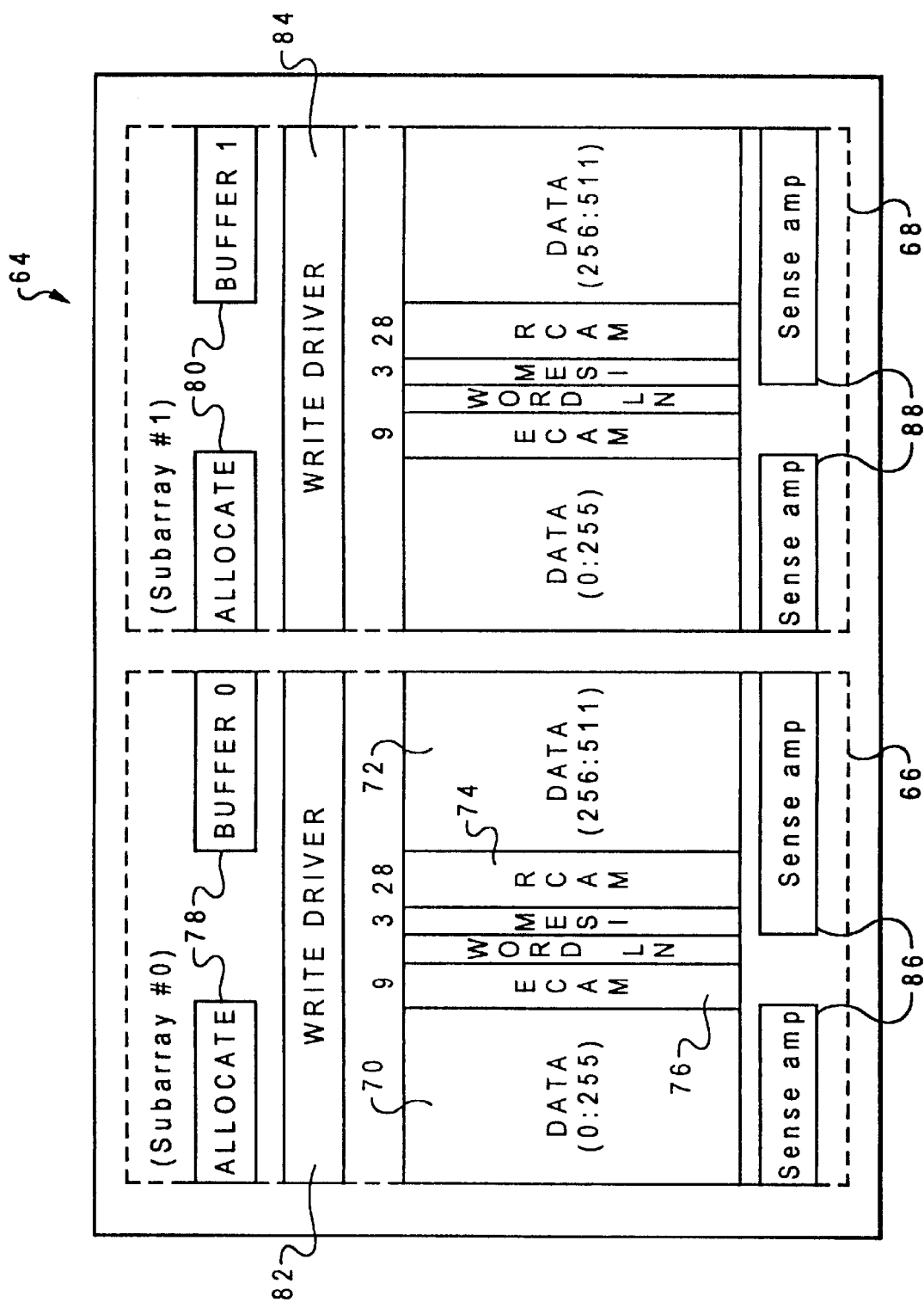
FIG. 4 is a high level block diagram of a multiple subarray cache provided in accordance with the present invention.

Referring now to FIG. 4, there is illustrated a high level block diagram of a multiple subarray cache 64 which is provided in accordance with the present invention. As illustrated, multiple subarray cache 64 preferably includes two subarrays 66 and 68; however, as those skilled in the art will appreciate upon reference to the present specification, a larger number of subarrays may be provided. As illustrated, data cache array unit 64 preferably contains 32K bytes of cache data and is physically subdivided into subarrays 66 and 68. Each subarray preferably includes 256 cache lines, wherein each cache line includes a 512 bit data field, which is broken into two segments, as depicted at 70 and 72 within subarray 66. Each cache line also preferably includes a 64 bit parity field (riot shown) a 28 bit RCAM field 74, a 8 bit ECAM field 76 and a 3 bit MESI field 78.

As those skilled in the art will appreciate the so-called "MESI" status bits are commonly utilized within data caches. The term "MESI" is an acronym which stands for "Modified," "Exclusive," "Shared," and "Invalid." Thus, the status of data within a particular line within a data cache may be rapidly and efficiently determined by determining the status of these three bits. Similarly, the status of data within a cache may be altered by writing different bits into the MESI field.

Additionally, as depicted within FIG. 4, each subarray includes an associated allocate buffer 78 and 80 and an associated write driver 82 and 84 which are utilized to drive data into a cache line within the array. Similarly, sense amplifiers 86 and 88 are provided for amplifying the output signal from a particular cache line. As illustrated within FIG. 4, by providing two separate and distinct content addressable fields within each line within the data cache array the data within that line may be accessed in a number of novel and efficient sequences.

Figure 5:
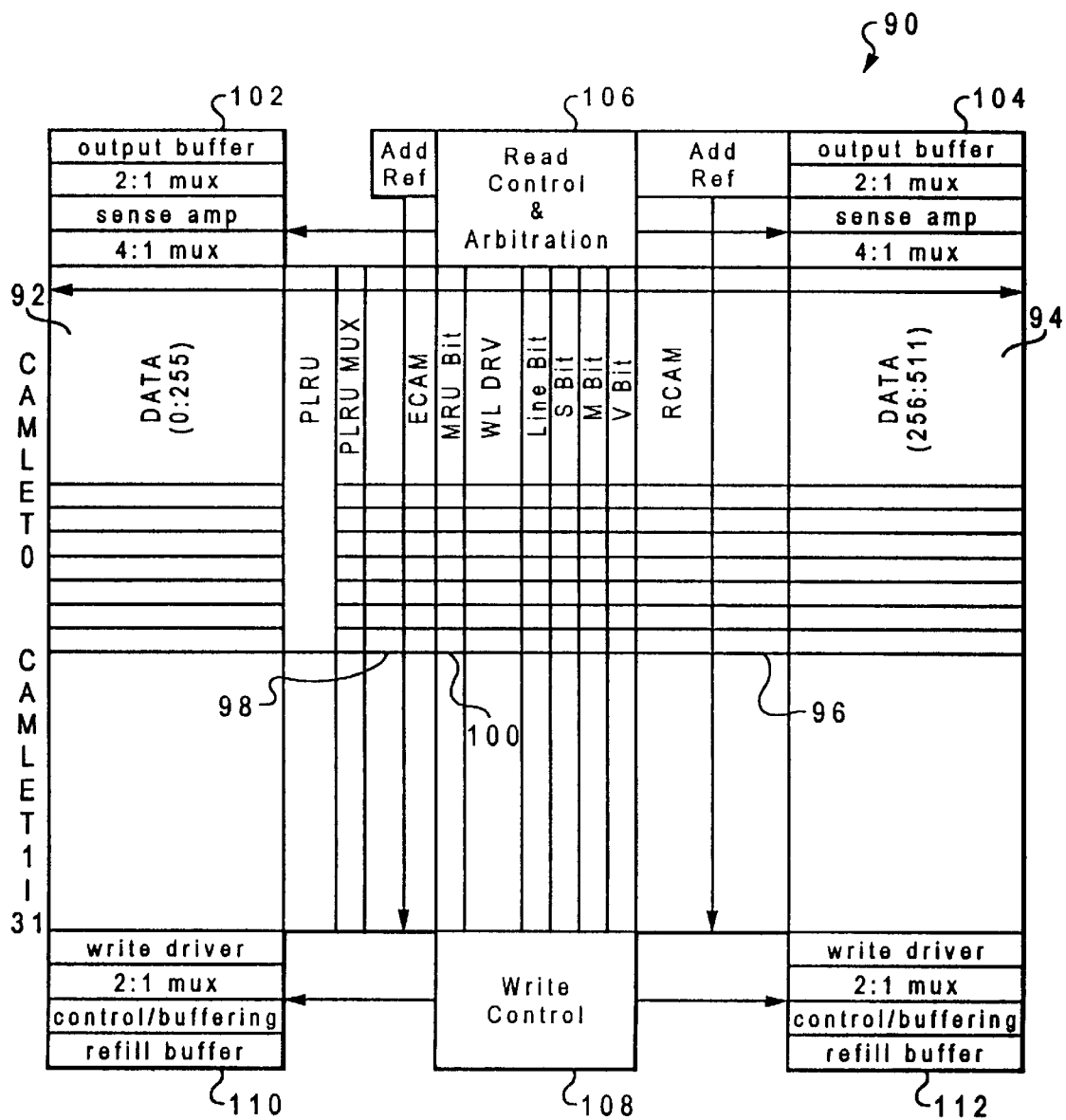
FIG. 5 is a more detailed block diagram of a single subarray of the cache of FIG. 6, illustrating one camlet in greater detail.

With reference now to FIG. 5, there is illustrated a more detailed block diagram of a single subarray of a cache provided in accordance with the present invention, illustrating one camlet in greater detail. As illustrated, a single subarray 90 is depicted. As described above, each line within subarray 90 includes 512 bits of data which is divided into data fields 92 and 94. A twenty-eight bit content addressable field containing a real address (RCAM) is illustrated at 96 and an eight bit effective address content addressable field (ECAM) is depicted at block 98. An additional most recently utilized (MRU) bit 100 is depicted and this bit is utilized, in conjunction with eight bit ECAM content addressable field 98 to resolve offset situations in which two or more effective addresses map to a single real address.

Figure 6:
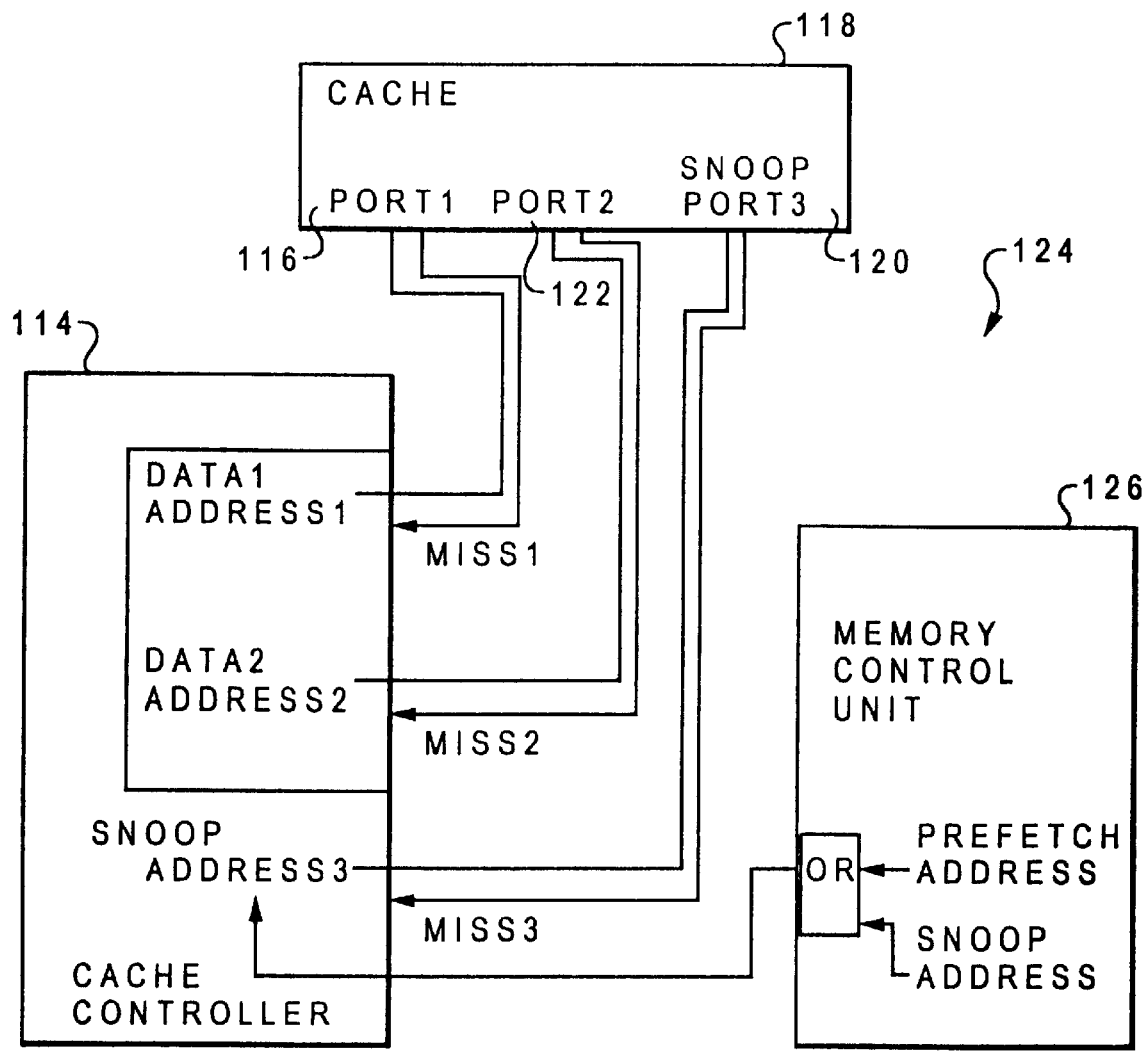
FIG. 6 is a high-level block diagram illustrating a system for allocation control within a cache provided in accordance with the present invention.

Output buffers and sense amplifiers 102 and 104 are utilized in a conventional manner to read data from a cache line. In accordance with a novel feature of the present invention two input ports are provided within each subarray. An effective address (EA) or real address (RA) input port 116 and another effective address (EA) or real address (RA) input port 122 are provided, as depicted in FIG. 6, such that port 116 and port 122 may be accessed by either the effective address (EA) or a real address (RA) during an RCAM lookup cycle. Thus, one effective address (EA) access port 116 and another effective address (EA) access port 122 may be utilized simultaneously during the same cycle and both data associated with EA addresses can be forwarded to a load/store unit through two data ports in cache 118. Also, one effective address (EA) access port 116 and one real address (RA) for RCAM lookup cycle access port 122 or one real address (RA) for RCAM lookup cycle access port 116 and one effective address (EA) access port 122 can be utilized simultaneously during the same cycle. A read control and arbitration logic circuit 106 is provided to ensure that in the event simultaneous access of the same subarray is attempted utilizing the port 116 and port 122, the lower priority cycle will be blocked and the higher priority cycle will be permitted to access the subarray. An exception to this technique and the preferred embodiment is the so-called "SNOOP" cycle which, in a manner which will be explained in greater detail herein, is provided by implementing a second word line for access of the MESI bits, such that a SNOOP access may be run concurrently with any of the effective address (EA) cycles. Finally, write control 108 is utilized in conjunction with write drivers and the associated multiplexes, as indicated at 110 and 112 to permit data within the data cache array to be written.

Referring now to FIG. 6, there is shown a block diagram to improve normal load access and memory prefetching in accordance with the present invention. Block diagram 124 includes cache controller 114, a cache 118 and memory control unit 126. In the preferred embodiment, in order to speed up the load access, a data cache controller 114, uses the effective address 44, as shown in FIG. 3, in the cache 118 to access the data. Referring also to FIG. 5, if the effective address 116 results in an ECAM 98 hit, the ECAM 98 should forward the data to a Load/Store unit. However, only a portion of the effective address is utilized to try to obtain a match within an ECAM field 98 on an initial cache look-up or prefetching cycle. When the portion of the effective address, that is utilized, indicates a "hit," but the data associated with that ECAM field 98 is not the appropriate data, a condition occurs known as an address "offset." This situation occurs wherein an entry within the cache includes the desired partial effective address; however, the real address of the data desired is not associated therewith.

In the prior art, in order to determined whether it was a true hit or not, the cache controller 114 had to perform a real address access (RCAM lookup cycle). If the RA resulted in an RCAM 96 hit, then the RCAM 96 forwarded the data to a Load/Store unit and no other actions were required. A disadvantage in the prior art occurred if the RA resulted in an RCAM 96 miss, then the normal miss sequence had to be executed. Due to the RCAM lookup cycle, the cache controller 114 had to block one of two addresses generation operations thereby slowing down all subsequent load accesses to the data cache 118.

In the preferred embodiment and referring once again to FIG. 6, a special port (an existing Real Address (RA) cache snoop port 120) is used to check whether a pre-fetching stream's line access is a true cache "hit" or not. The snoop read access uses a (33-bit) real address to access the data cache 118 and by not occupying a data port is used to test the pre-fetching 126 stream hit. Therefore, by changing the RCAM 96 lookup cycle to an RCAM snoop 120 cycle, the cache controller 114 does not need to block any EA accesses and is still able to use the RA access to the cache 118 to determine whether it is a true hit or not. By way of example, if the ECAM 98 hits and the RCAM 96 misses due to a 1MEG offset EA address, and then if the RCAM 126 snoop access hits by using an RA address, then a prefetch stream's line is in the cache memory and cache controller 114 kills the operation. If the RCAM snoop 126 cycle accesses a complete miss, then the prior art (RCAM lookup cycle) normal miss sequence is executed.

Next, if the portion of the effective address contained within the ECAM 98 field within the cache 118 does not match the desired effective address upon initial look-up or prefetching, the desired data may still be present within the cache, this situation is called an "ECAM miss." This is due to the fact that it is possible for two different effective addresses to map to the same real address presenting a condition known as virtual address "aliasing." In this scenario a partial effective address is utilized to access the ECAM 98, and no stored ECAM 98 field within the desired subarray and camlet matches the desired partial effective address. Once again, the RCAM 126 snoop access hits by using an RA address, then a prefetch stream's line is in the cache memory and cache controller 114 kills the operation. If the RCAM snoop 126 cycle accesses a complete miss, then the prior art (RCAM lookup cycle) normal miss sequence is once again executed. Therefore, by using the RCAM snoop 120 read cycle, the full use of the bandwidth of the ECAM access port 116 as well as the other ECAM port 122 will speed up a majority of the load hit cases.

Upon reference to the foregoing those skilled in the art will appreciate that by utilizing two Effective Address (EA) accesses and a special RCAM snoop access can access the data cache simultaneously enabling an increase in prefetching performance wherein the data cache array of the present invention may be rendered substantially more efficient than fully associative cache designs while maintaining the high hit ratio of set associative cache designs known in the prior art.

While the invention has been particularly shown and described with reference to a preferred embodiment, it will be understood by those skilled in the art that various changes in form and detail may be made therein without departing from the spirit and scope of the invention.

What is claimed is:

1. A cache memory, comprising:

a cache storage array having at least one data port for data access having an address input that accepts real and effective addresses, and a snoop port having a snoop address input for supplying a snoop address, and wherein said snoop port has a snoop miss output for indicating whether a value corresponding to said snoop address input is present within said cache storage array, said snoop port having no capability to transfer data, wherein said snoop port and said at least one data port can be used simultaneously; and a cache controller, coupled to said cache storage array, for directing a prefetch of said value, wherein said cache controller kills said prefetch if said snoop miss output indicates that said value is present within said cache storage array.

2. The cache memory of claim 1, wherein said snoop miss output is derived from a comparison of a portion of an effective address.

3. The cache memory of claim 1, wherein said at least one data port comprises two data ports, and both of said data ports can be accessed with an effective address simultaneously with said snoop port being accessed with a real address.

4. The cache memory of claim 3, wherein each of said data ports has a miss output, and said cache controller kills said prefetch if either of said data port miss outputs and said snoop miss output indicate that said value is not present in said cache memory.

5. The cache memory of claim 1, wherein said at least one data port comprises two data ports, and one of said data ports can be accessed with an effective address while the other of said data ports is accessed with a real address and while said snoop port is accessed with a second real address.

6. A method for managing prefetches from a memory subsystem to a cache memory, and at least one data port having an address input that accepts real and effective addresses, said method comprising the steps of:

initiating a prefetch request to said memory subsystem;

determining whether or not a value is present within said cache memory by utilizing a snoop port having an address input, wherein said snoop port further has a snoop miss output, and wherein said snoop port has no data access capability;

accessing said value in said cache memory using said at least one data port while said snoop port is being utilized; and killing said prefetch request in response to a determination that said value is present within said cache memory.

7. The method of claim 6, further comprising the step of second determining that a value corresponding to an effective address is present in a cache memory by utilizing said data port, and said killing step is further performed responsive to said second determination.

8. The method of claim 6, wherein said cache memory comprises two data ports, wherein said step of accessing accesses said value using an effective address at a first data port and further comprising the step of second accessing another value using a real address at a second data port while said first data port is being accessed.

9. The method of claim 6, wherein said step of accessing accesses said value using an effective address at a first data port and further comprising the step of second accessing another value using a second effective address at a second data port while said first data port is being accessed.

10. The method of claim 6, wherein each of said data ports has a data port miss output, and said determining step determines that one of said data port miss outputs and said snoop miss output indicate that said value is not present in said cache memory.

* * * * *

UNITED STATES PATENT AND TRADEMARK OFFICE
CERTIFICATE OF CORRECTION

PATENT NO.    : 6,202,128 B1
DATED         : March 13, 2001
INVENTOR(S)   : Chan et al.

It is certified that error appears in the above-identified patent and that said Letters Patent is hereby corrected as shown below:

Column 1,
Line 31, please add -- storage -- after "efficient".

Signed and Sealed this

Twenty-third Day of March, 2004

JON W. DUDAS
*Acting Director of the United States Patent and Trademark Office*